(12) United States Patent
Daughtry, Jr.

(10) Patent No.: US 9,792,239 B2
(45) Date of Patent: Oct. 17, 2017

(54) TABLET CASE WITH SWITCHING CIRCUIT FOR ON-THE-GO USB PORT

(71) Applicant: Genesis Technology USA, Inc, Norcross, GA (US)

(72) Inventor: Earl Anthony Daughtry, Jr., Lawrenceville, GA (US)

(73) Assignee: Genesis Technology USA, Inc., Norcross, GA (US)

( * ) Notice: Subject to any disclaimer, the term of this patent is extended or adjusted under 35 U.S.C. 154(b) by 317 days.

(21) Appl. No.: 14/613,107

(22) Filed: Feb. 3, 2015

(65) Prior Publication Data

US 2015/0242350 A1    Aug. 27, 2015

Related U.S. Application Data

(60) Provisional application No. 61/945,379, filed on Feb. 27, 2014.

(51) Int. Cl.
*H05K 7/10*    (2006.01)
*G06F 13/40*   (2006.01)

(52) U.S. Cl.
CPC ........ *G06F 13/4022* (2013.01); *G06F 13/409* (2013.01); *G06F 13/4068* (2013.01)

(58) Field of Classification Search
USPC ................... 710/300–317, 104–110
See application file for complete search history.

(56) References Cited

U.S. PATENT DOCUMENTS

| 2010/0161842 A1* | 6/2010 | Shan | G06F 1/3209 710/18 |
| 2013/0167226 A1* | 6/2013 | Lin | H04M 1/0256 726/19 |
| 2014/0152102 A1* | 6/2014 | Chen | G06F 1/1632 307/31 |

\* cited by examiner

*Primary Examiner* — Raymond Phan
(74) *Attorney, Agent, or Firm* — Lee & Hayes, PLLC; Charles L. Warner

(57) ABSTRACT

A tablet cover (100) and circuitry (400) provide for convenient connection of a tablet (105) or other personal electronic device to additional memory, functions, and features as provided by an internal device (215) and/or an external device (160). The circuitry selectively connects the tablet, the external device, and the additional memory together. The additional memory is internal to the case and is thereby protected from loss or damage due to accidental impact.

15 Claims, 4 Drawing Sheets

TABLET CASE WITH SWITCHING CIRCUIT FOR ON-THE-GO USB PORT

CROSS-REFERENCE TO RELATED APPLICATION

This application claims the priority of U.S. Provisional Patent Application No. 61/945,379, filed Feb. 27, 2014, and titled "Tablet Case With On-The-Go USB Port", the entire disclosure and contents of which are hereby incorporated herein by reference.

BACKGROUND

A "tablet" is typically considered to be a general-purpose computing device, usually contained in a single panel, and using a touch screen as the input device and as the display device. The preceding sentence is to indicate the general nature of a tablet, is not a definition, and is not limiting, as other functions, features, and capabilities may be provided in, or for use with, a tablet.

Some tablets have a micro-USB "on-the-go" or "OTG" port. The OTG port allows the tablet to switch back and forth between the roles of a host device or a client device. For example, if a memory card is plugged into the OTG port, the tablet acts as a host device to write to and/or read from the memory card, but the tablet then acts as a client device, such as a USB Mass Storage Device, when the tablet is connected to a host computer via the OTG port. If, however, some information in the tablet memory is to be transferred to both a memory card and a host computer, then multiple operations are required: the memory card must be plugged in, the information transferred, the memory card unplugged, the host computer plugged in, the information transferred, and then the host computer unplugged. Likewise if information from a memory card and other information from a host computer are to be transferred to the tablet memory, then multiple operations are required.

The standard internal memory of many devices, including but not limited to tablets, may be somewhat limited, however, thus making additional memory desirable or even necessary. Buying a larger internal memory at the time of purchase is often an expensive proposition at the consumer end, adding more internal memory after purchase may be difficult, extremely expensive, or even practically impossible, especially by the consumer, and a manufacturer may be reluctant to even provide the option or capability to add more memory. Thus, the consumer may be faced with the choice of paying substantially more at the time of purchase for additional internal memory, or of being resigned to the internal memory size that the consumer can afford at the time of purchase. Or, if the manufacturer provides an OTG port, the consumer can plug a memory card into the OTG port. In this case the memory card will extend from the tablet, thus making the memory card susceptible to accidental impact, which can result in the memory card being unplugged and lost, the memory card being damaged, and/or the tablet being damaged.

SUMMARY

A tablet cover and circuitry provide for convenient connection of a tablet or other personal electronic device to additional memory, functions, and features as provided by an internal device and/or an external device. The circuitry selectively connects the tablet, the external device, and the additional memory together. The additional memory is internal to the case and is thereby protected from loss or damage due to accidental impact.

DETAILED DESCRIPTION

Figure 1:
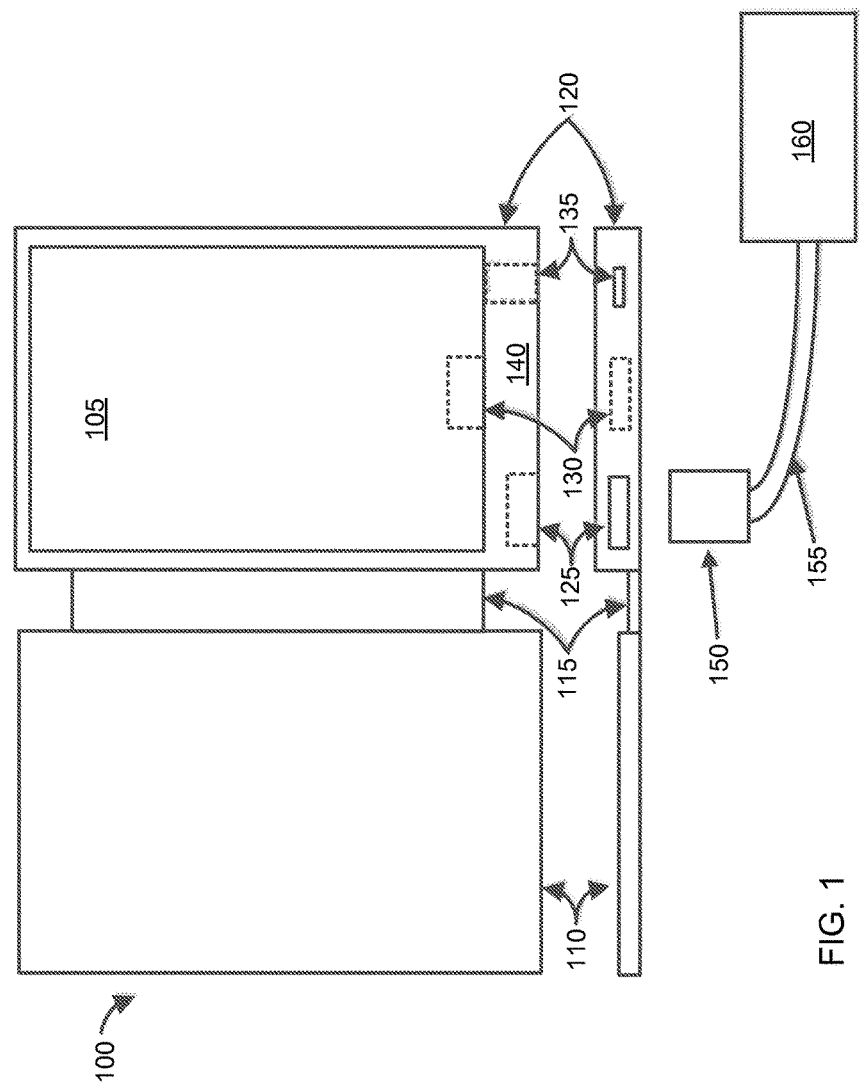
FIG. 1 illustrates front and edge views of an exemplary tablet case surrounding an exemplary tablet.

FIG. 1 illustrates front and edge views of an exemplary tablet case 100 surrounding an exemplary tablet 105. The tablet case 100 preferably, but not necessarily, has a front cover 110 which is connected to a back cover 120 via a hinge 115. The front cover 110, hinge 115, and back cover 120 are preferably, but not necessarily, formed and manufactured as a single piece of flexible material. The tablet 105 has an on-the-go micro-USB port 130, and another port 135 for connecting, by way of example and not of limitation, a power supply, headphones, an accessory, etc. The case 100 has an external USB port 125 which is preferably, but not necessarily, offset from the micro-USB port 130; that is, the port 125 is not in-line with the port 130. Although a micro-USB port is referenced herein, that is merely a current implementation of a USB port or USB standard so the term "micro-USB port" should be understood to include future iterations of, and modifications to, USB ports and standards. The port 125 is configured to accept a USB plug 150 at one end of a USB cable 155 so as to connect a device 160 to the tablet 105. The device 160 may be a host device, such as a computing device, or may be a memory device, a battery pack, a power supply, or other device which provides a feature, function, or capability useful with the tablet 105. It is expected that, for most occasions, the device 160 will be a computing device so, for convenience of discussion below, the device 160 may sometimes be referred to as a computing device 160. The tablet cover 100 is slightly larger than is necessary to accommodate the tablet 105 so as to provide space 140 for the electronic circuitry 200 discussed below with respect to FIGS. 2 and 3.

Future iterations of the standard for the USB interface are expected to eliminate the host/client device distinction or relationship so that the interface will be truly bi-directional. That change, and other changes in the standard, only slightly alter the environment, and do not impact the functionality of the apparatus and techniques disclosed herein.

The tablet cover 100 and electronic circuitry 200 provide for additional memory which expands the memory capability of the tablet, additional memory which does not have to be plugged in and then unplugged, additional memory which does not extend from the tablet and therefore will not be lost or damaged by an accidental impact, additional memory which does not monopolize the use of the OTG USB port, and the addition of other types of devices to enhance the functionality and/or features of the tablet.

Figure 2:
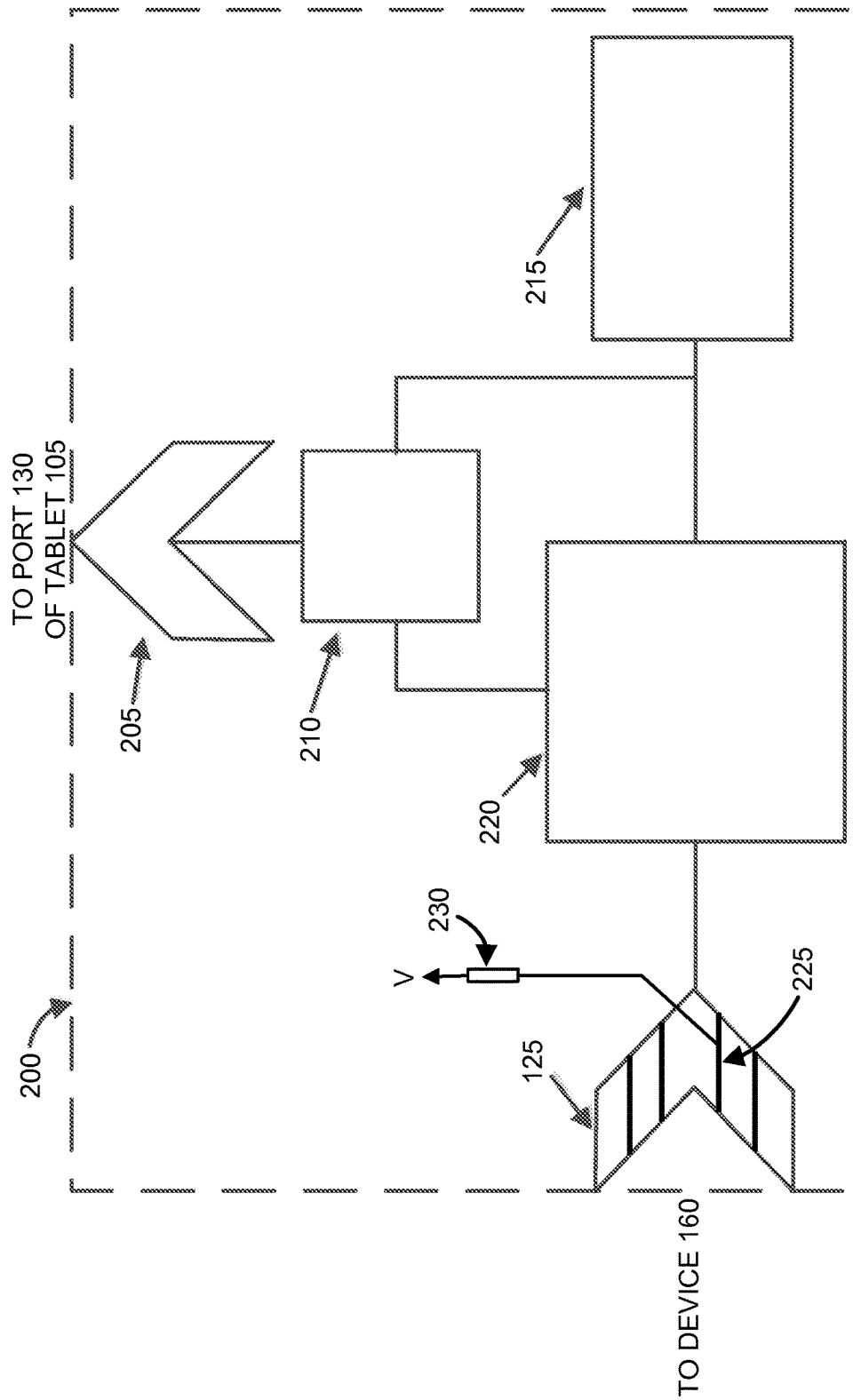
FIG. 2 illustrates an embodiment of the circuitry of the tablet case.

FIG. 2 illustrates an embodiment of the circuitry 200 of the tablet case 100. The electronic circuitry 200 includes an external USB port 125, an internal micro-USB plug 205, a switch 210, a USB 2-port hub chip 220, and a device 215. The device 215 may be a memory device or any other very small device which provides a feature, function, or capability useful with the tablet 105, such as, but not limited to, a temperature sensor or an electronic compass. It is expected that, for most occasions, the device 215 will be a memory device so, for convenience of discussion below, the device 215 may sometimes be referred to as a memory device 215. The external USB port 125, which may be a standard USB OTG port, a mini-USB OTG port, or a micro-USB OTG port, is configured to accept a correspondingly-sized USB plug which may be connected to the computing device 160. The internal micro-USB plug 205 is configured to plug into the micro-USB port 130 of the tablet 105 when the tablet 105 is installed into the cover 100. The memory device 215 may be, for example, a compatible memory such, but not limited to, a Micro SD card. Switch 210 and hub 220 provide for interconnection between the tablet 105, the computing device 160, and the memory device 215.

If the computing device 160 is not present, switch 210 connects the tablet 105 to the device 215. Alternatively, switch 210 could connect the tablet to hub 220 which, in turn, connects the tablet 105 to the device 215. In either configuration, the tablet 105 has access to additional memory, information, features and/or functions as provided by the device 215.

If the computing device 160 is present, then hub 220 connects the computing device 160 to device 215 and to switch 210 which, in turn, connects the computing device 160 to the tablet 105. Also, the switch 210 allows the tablet 105 to connect to the device 215 and to hub 220 which, in turn, connects the computing device 160 to the tablet 105.

Figure 3:
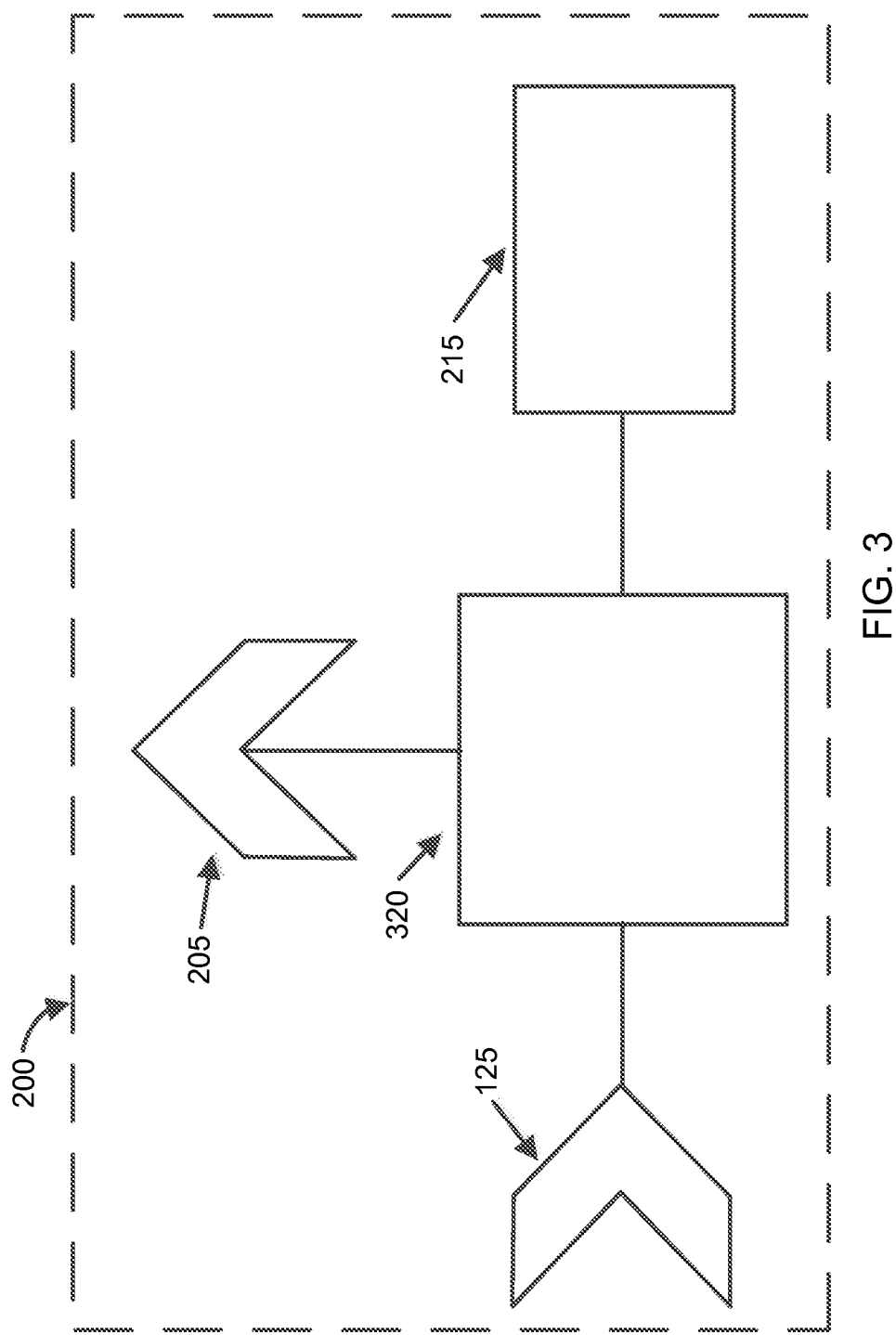
FIG. 3 illustrates alternative circuitry which has only a single switch or 3-port hub.

FIG. 3 illustrates alternative circuitry 200 which has only a single switch or 3-port hub 320, which allows the tablet 105, the computing device 160, and the device 215 to communicate with each other. For example, if computing device 160 is not present, hub 320 connects the tablet 105 to the device 215 so that the tablet 105 has access to additional memory, information, features and/or functions as provided by device 215. If computing device 160 is present, then hub 320 connects the computing device 160, tablet 105, and device 215.

Thus, in both FIGS. 2 and 3, the tablet 105 can communicate with both the computing device 160 and the device 215, and the computing device 160 can communicate with both the tablet 105 and the device 215. This permits the user to modify the contents of the computing device 160 or the memory device 215 such as, but not limited to, adding a movie file to memory device 215 or copying or transferring an audio or video file from the memory device 215 to the computing device 160. When the computing device 160 data cable 155 is removed, the switching circuitry (components 210, 220, 320) restores the on-the-go function whereby the tablet 105 has sole control of the memory device 215.

Thus, the computing device 160 can write to, and/or read from, both the tablet 105 and the additional memory device 215 without having to connect or disconnect anything other than the computing device 160. Further, the tablet 105 has continuous access to the additional memory device or other device 105.

The presence or absence of a computing device 160 on port 125 can be detected by the hub 220 or 320 by detecting the presence or absence of a voltage on a pin of the port 125, such as but not limited to one of the data pins 225 of the port 125. The presence or absence of computing device 160 on port 125 can therefore cause the tablet 105 to switch between a "client" mode and a "host" mode. Optionally, as shown in FIG. 2, a pull-up or pull-down resistor 230 may be used to force a pin 225 to a particular voltage (V) or state when a device is not connected to the port 125.

Figure 4:
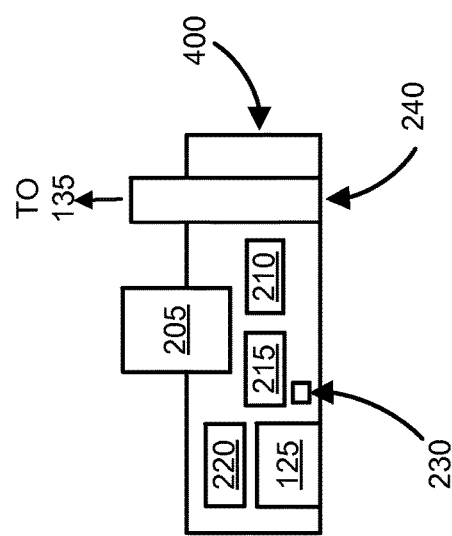
FIG. 4 is a block diagram of an exemplary circuit board showing the various components thereon.

Also as shown in FIGS. 1-3, the circuitry 200 components (switch 210, hubs 220 and 320, and memory 215) are preferably enclosed in the space 140 in the case 100. There is preferably, but not necessarily, a small circuit board 400 (as shown in FIG. 4) on which those components are mounted, or which has a connector into which a component, such as the memory device 215, may be installed.

Thus, when the user is away from his/her computing device 160, the tablet 105 has access to the expanded memory of device 215 or the features or functions of another type of device which the tablet 105 can recognize and use without the device 215 extending from the tablet 105. Then, when the user attaches the computing device 160 to the tablet 105 through the circuitry 200 of the tablet case 100, the computing device has access to the tablet 105 and the device 215, and the tablet 105 has access to the computing device 160 and the device 215. Therefore, the tablet case 100 and circuitry 200 provide for convenient and expanded use of the tablet 105.

The device 160 may also be a battery pack or an additional memory. If device 160 is a battery pack, a memory, or a battery pack with memory, then the circuit(s) 210, 220, 320 connect(s) the device 160 to the tablet 105 via the port 205.

The plug 150 and port 125 may be standard USB components, mini-USB components, micro-USB components, other size components, or another type of plug/port.

FIG. 4 is a block diagram of an exemplary circuit board 400 showing the various components 125, 205, 210, 215, 220, and 230 thereon. Although components 210, 215, 220 and 230 are shown as separate components, it will be appreciated that any two, any three, or all four of them could be implemented as a single component and similarly if component 320 is used instead of components 210 and 220. Optionally, the circuit board 400 is not used, and the various components are secured to the case and/or to each other by using a glue, for example, epoxy.

In one embodiment, the component 240 may simply be an opening which allows access to the port 135 so that a user can directly insert a plug into the port 135. The opening may be a space between the case 100 and one face of the circuit board 400, or the opening may be a space between the side of the case 100 and one end of the circuit board 400. In another embodiment the component 240 may be a female-male straight-through connector, the male end of which plugs into the port 135, and the female end of which appears at the surface of the case 100 so that it is conveniently accessible to the user.

Although the above discussion has been directed to a tablet 105, it will be appreciated that the tablet cover 100 and circuitry 200 may also be used with other personal electronic devices, such as but not limited to smartphones. Further, although the above discussion has been directed to a USB port, it will be appreciated that the above-described circuitry and technique may also be used with other types of ports which provide at least the same functionality of a USB port which is used as described herein.

Based on the foregoing, it should be appreciated that a tablet cover and circuitry which provide for convenient connection of the tablet to additional memory, functions, and features as provided by an internal device 215 and/or an external device 160 have been disclosed herein. Although the subject matter presented herein has been described in language specific to tablets, it is to be understood that the invention disclosed herein is not necessarily limited to the specific features, configurations, or components described herein. Rather, the specific features, configurations and components are disclosed as example forms. Further, all of the various features, configurations, and components need not be embodied in a single item to gain the benefits of other features, configurations, and components.

The subject matter described herein is provided by way of illustration for the purposes of teaching, suggesting, and describing, and not limiting. Alternatives to the illustrated embodiment are contemplated, described herein, and set forth in the claims. Various modifications and changes may be made to the subject matter described herein without following the example embodiments and applications illustrated and described, and without departing from the true spirit and scope of the present invention.

What is claimed is:

1. An apparatus to provide at least one of an additional functionality or an additional feature to a personal electronic device, the apparatus comprising:
   a case to at least partially enclose the personal electronic device;
   a first port appearing on the surface of the case;
   a second port internal to the case and adapted to interface with a first port on the personal electronic device;
   an expansion device which provides the at least one additional functionality or additional feature; and
   a switching circuit connected to the first port of the case, the second port, and the expansion device, to selectively connect two or more of the first port of the case, the second port, and the expansion device to each other.

2. The apparatus of claim 1 and further comprising a circuit board contained within the case, and wherein at least one of the first port of the case, the second port, the expansion device, or the switching circuit is mounted on the circuit board.

3. The apparatus of claim 1 wherein the case has an opening which provides access to a second port of the personal electronic device.

4. The apparatus of claim 1 wherein the expansion device is a memory.

5. The apparatus of claim 1 wherein the switching circuit is responsive to a voltage on at least one pin on the first port of the case to connect the second port to the first port of the case.

6. The apparatus of claim 1 wherein the switching circuit is responsive to a voltage on at least one pin on the first port of the case to connect all of the first port of the case, the second port, and the expansion device to each other.

7. The apparatus of claim 1 wherein the first port of the case is offset from the first port of the personal electronic device.

8. An apparatus to provide at least one of an additional functionality or an additional feature to a personal electronic device, the apparatus comprising:
   a case to at least partially enclose the personal electronic device;
   a first port appearing on the surface of the case;
   a second port internal to the case and adapted to interface with a first port on the personal electronic device;
   an expansion device which provides the at least one additional functionality or added feature;
   a switching circuit connected to the first port of the case, the second port, and the expansion device, and responsive to a voltage on at least one pin on the first port of the case to selectively connect two or more of the first port of the case, the second port, and the expansion device to each other; and
   a circuit board contained within the case, and wherein at least one of the first port of the case, the second port, the expansion device, or the switching circuit is mounted on the circuit board.

9. The apparatus of claim 8 wherein the case has an opening which provides access to a second port of the personal electronic device.

10. The apparatus of claim 8 wherein the first port of the case is offset from the first port of the personal electronic device.

11. An apparatus, comprising:
    a personal electronic device having a first port;
    a case to at least partially enclose the personal electronic device;
    a first port appearing on the surface of the case;
    a second port internal to the case and connected to the first port on the personal electronic device;
    an expansion device which provides at least one of an additional functionality or an additional feature to the personal electronic device;
    a switching circuit connected to the first port of the case, the second port internal to the case, and the expansion device, and responsive to a voltage on at least one pin on the first port of the case to selectively connect two or more of the first port of the case, the second port, and the expansion device to each other; and
    a circuit board contained within the case, and wherein at least one of the first port of the case, the second port, the expansion device, or the switching circuit is mounted on the circuit board;
    wherein the first port of the case is offset from the first port of the personal electronic device.

12. The apparatus of claim 11 wherein the personal electronic device is a tablet.

13. The apparatus of claim 11 wherein the personal electronic device is a smartphone.

14. The apparatus of claim 11 wherein the case has an opening which provides access to the second port of the personal electronic device.

15. The apparatus of claim 11 wherein the expansion device is a memory device.

* * * * *